Figure 1:
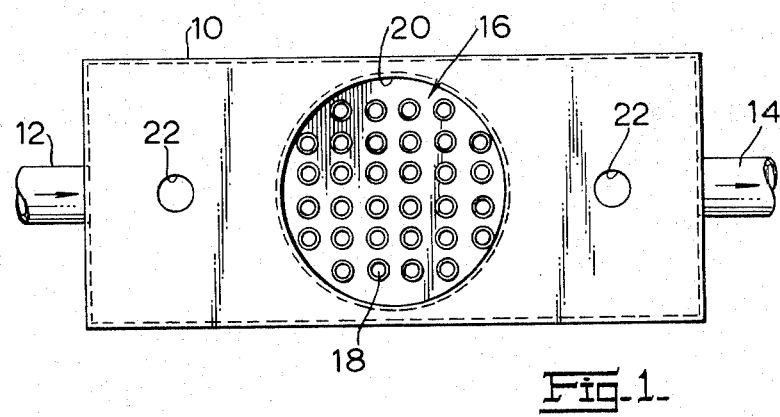

United States Patent [19]
Fisher

[11] 3,797,468
[45] Mar. 19, 1974

[54] FUEL SYSTEM OF INTERNAL COMBUSTION ENGINES

[76] Inventor: David Fisher, 22 Beechurst Rd., Liverpool L25, 3QA, England

[22] Filed: Aug. 29, 1972

[21] Appl. No.: 284,485

[52] U.S. Cl.......... 123/133, 123/119 D, 123/122 R, 123/122 A
[51] Int. Cl.............................. F02m 31/10
[58] Field of Search............ 123/122 R, 122 A, 133, 123/119 D, 141

[56] References Cited
UNITED STATES PATENTS

| | | | |
|---|---|---|---|
| 1,184,611 | 5/1916 | Boucher | 123/119 DB X |
| 1,457,403 | 6/1923 | Snagg | 123/119 DB X |
| 1,539,963 | 6/1925 | Sherbondy | 123/122 A X |
| 1,611,299 | 12/1926 | Wicka | 123/141 X |
| 1,703,374 | 2/1929 | Voigt et al. | 123/122 A |
| 1,706,860 | 3/1929 | Petit | 123/122 A |
| 1,795,037 | 3/1931 | Portail | 123/122 A |
| 1,833,183 | 11/1931 | Sawtelle | 123/122 A |
| 2,836,161 | 5/1958 | Primakoff | 123/122 A |
| 3,386,426 | 6/1968 | Kamijo | 123/133 X |
| 3,667,436 | 6/1972 | Reichhelm | 123/133 X |

*Primary Examiner*—Al Lawrence Smith
*Attorney, Agent, or Firm*—Scrivener, Parker, Scrivener & Clarke

[57] ABSTRACT

A heat exchanger is incorporated between the carburetor and inlet manifold of an internal combustion engine to enhance fuel vaporization and therefore reduce fuel consumption and harmful exhaust emissions. The heat exchanger is preferably connected into the cooling system of the engine. In a development, an auxiliary air bleed is provided upstream of the heat exchanger to convert vapourized fuel into a fog to further enhance efficient combustion.

4 Claims, 5 Drawing Figures

FUEL SYSTEM OF INTERNAL COMBUSTION ENGINES

The present invention relates to fuel systems of internal combustion engines and relates more particularly to devices for enhancing fuel vapourization.

It is known that fuel vapourization and mixture distribution in internal combustion engines having one or more carburettors in direct communication with an inlet manifold may be enhanced by supplying heat to the inlet manifold. Conveniently heat is supplied to the inlet manifold by thermal conduction from hot exhaust gases in an adjacent exhaust manifold. In an alternative arrangement, the inlet manifold is encased within a water jacket through which hot water from the engine cooling system is directed. The latter arrangement has the advantage that overheating of the inlet manifold and a resulting decrease in air density and volumetric efficiency is unlikely.

In each of these arrangements, heat is supplied directly to the inlet manifold and the fuel and air mixture is heated by contact with the manifold.

The present invention seeks primarily to provide a means to supply heat directly to the fuel and air mixture independently of the inlet manifold.

According to the present invention, a device for enhancing fuel vapourization in internal combustion engines comprises a heat exchanger having a through passage to provide communication between a carburettor and an inlet manifold, a heat exchange element disposed within the through passage and means to secure the heat exchanger between the carburettor and the inlet manifold.

Fuel-air mixture flowing into the inlet manifold is heated by the heat exchange element contained within the device. This heating results in enhanced fuel vapourization and the presence of the heat exchange element further improves mixture distribution by promoting turbulence.

The design of the heat exchange element may be of any convenient form such as a coiled tube or a plurality of spaced parallel tubes of any suitable material, typically a metal and preferably a metal such as copper which has high thermal conductivity. The dimensions and design of the heat exchange element should be such that adequate heating of the mixture is ensured without undue hindrance to gas flow into the inlet manifold.

When the carburettor and manifold between which the device is to be interposed are of the type which are normally secured together by bolts passing through aligned bores in complementary flanges, the said means to secure the heat exchanger between the carburettor and the inlet manifold will comprise openings in the heat exchanger through which may be passed bolts which clamp the heat exchanger between said flanges.

In a development of the present invention, there is provided an internal combustion engine induction unit comprising a heat exchanger and auxiliary air intake means disposed downstream of the heat exchanger. In preferred embodiments, the unit functions such that auxiliary air drawn in through said intake means combines with the heated fuel-air mixture emerging from the heat exchanger in vapour form to produce a fog of fuel in air. The production of such a fog gives rise to highly efficient combustion resulting in economy of fuel and a significant decrease in harmful exhaust emission.

The auxiliary air intake means preferably comprises an air bleed tube or bore opening into a venturi. Advantageously, the unit is used in combination with a carburettor from which has been removed the throttle-control butterfly valve, a butterfly valve being positioned in the unit, downstream of the auxiliary air intake means, to control the carburettor venturi and the venturi of the air intake means.

The heat exchanger is preferably adapted to be heated by the internal combustion engine cooling medium. To provide for operation of the heat exchanger when the engine and its cooling medium are cold, electric heating means may be associated with the heat exchanger. As an alternative to employing the engine cooling medium, the heat exchanger may be directly electrically heated.

Figure 2:
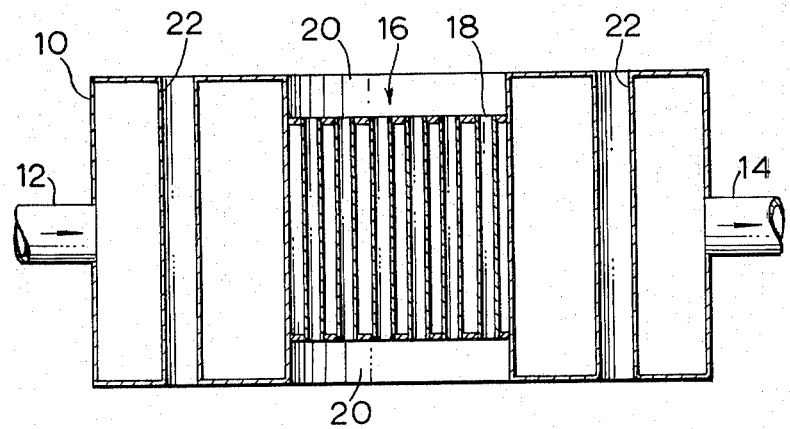
Figure 3:
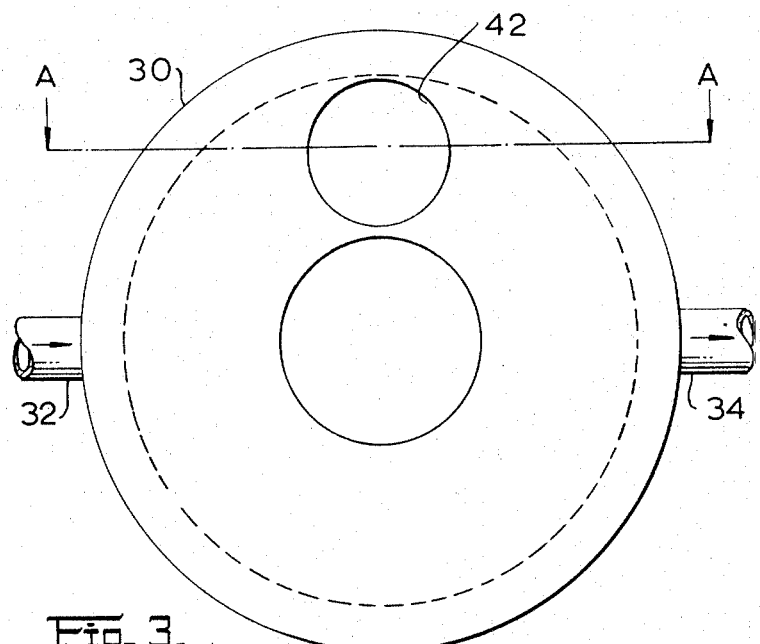
Figure 4:
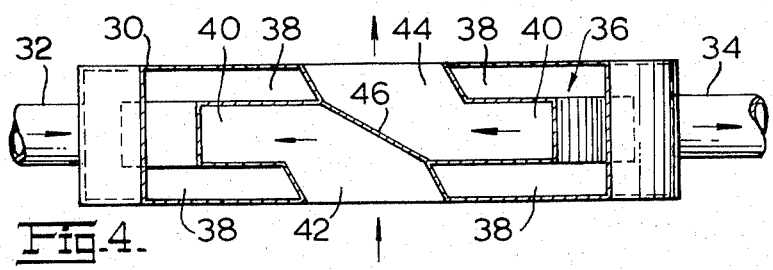
Figure 5:
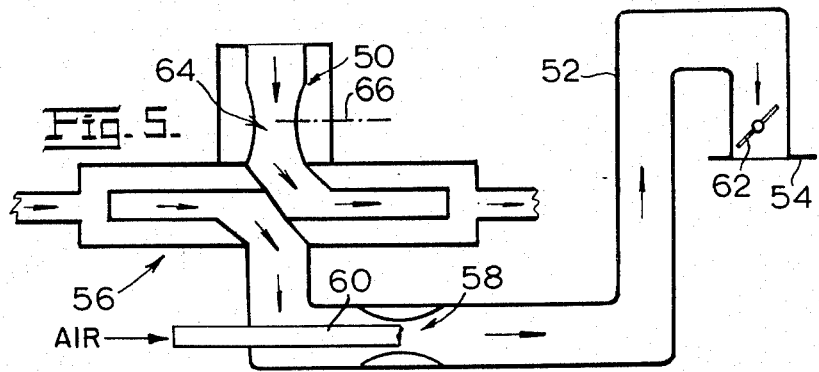

The invention is further described by way of example with reference to the accompanying drawings, in which:

FIG. 1 is a plan view of one embodiment of heat exchanger constructed in accordance with the invention, FIG. 2 is a side elevation, in section, of the heat exchanger of FIG. 1, FIG. 3 is a plan view of a second embodiment of heat exchanger, FIG. 4 is a section on the line A—A of FIG. 3, and FIG. 5 is a diagrammatic representation of an induction unit incorporating the heat exchanger of FIGS. 3 and 4.

The heat exchanger shown in FIGS. 1 and 2 comprises a hollow casing 10 having a water inlet 12 and water outlet 14 at opposite ends and a heat exchange element 16 which is formed of spaced parallel tubes 18 and which is positioned in registry with aligned openings 20 in the casing 10. Sleeves 22 extending across the casing 10 serve to receive fasteners such as bolts to secure the heat exchanger between a carburettor and an inlet manifold.

In a modification, the water inlet and outlet communicate with tubes such as the tubes 18 and the fuel-air mixture to be heated flows between the tubes. In further modifications, the heat exchange element may comprise one or more coiled or serpentine tubes and heat transfer ribs may be provided to enhance heat flow to the fuel-air mixture.

FIGS. 3 and 4 show a second exemplary heat exchanger having a torroidal hollow casing 30 with diametrically opposed water tubes 32, 34 serving as a water inlet and outlet respectively. The inlet 32 and outlet 34 communicate with a water jacket 36 which in plan view is of annular configuration and in elevation has a generally U-shaped configuration. Between the limbs 38 of the U-section is an annular passage 40 for fuel-air mixture which enters through an inlet 42 and leaves through an outlet 44. The inlet and outlet 42, 44 are separated by a partition 46 so that fuel-air mixture must circulate once around the annular passage 40 before reaching the outlet 44. The heat exchanger of FIGS. 3 and 4, whilst being compact, provides a long flow path of large cross-section for the fuel-air mixture.

Means such as the sleeved openings of the embodiment of FIGS. 1 and 2 are provided (not shown) to enable the heat exchange to be mounted.

The heat exchangers described above are adapted to be mounted between a carburettor and inlet manifold of an internal combustion engine and serve to heat the fuel-air mixture produced by the carburettor to vaporise the fuel and produce an intimate mixture when the cooling medium of the engine is hot. To provide for heating when the engine is cold, an electric heating element (not shown) may be incorporated into the heat exchangers to pre-heat the cooling medium in the casings. As an alternative to employing the engine cooling medium, the heat exchangers may be directly electrically heated.

FIG. 5 shows diagrammatically an induction unit in combination with a carburettor 50. The unit comprises a pipe 52 having at one end a flange 54 for connection to an inlet manifold and at the other end a heat exchanger 56 similar to that of FIGS. 3 and 4. The carburettor 50 is mounted on the inlet side of the heat exchanger 56. An electrical heating element may be provided to heat fuel in the carburettor float chamber or at least the main jet of the carburettor may be electrically heated.

An intermediate region of the pipe 52 is formed with a venturi 58 into which opens an air bleed pipe 60 and a butterfly valve 62 is located adjacent to the flange 54. The carburettor 50 is standard in having a venturi 64 and a main fuel jet 66 but has no butterfly valve. Thus the butterfly valve 62 in the pipe 52 controls the depression across the venturi 58 and the venturi 64.

In operation of the unit shown in FIG. 5 when the flange 54 is connected to an internal combustion engine inlet manifold, fuel is metered into the air stream in a conventional manner by the carburettor 50 and the fuel in the resulting fuel-air mixture is vaporised during passage through the heat exchanger 56. The vapour mixture flows through the venturi 58 and draws auxiliary air into the unit through the bleed tube 60. The cool auxiliary air converts the vapour mixture into a fog which passes into the engine for combustion.

When a unit such as that shown in FIG. 5 is incorporated into the induction system of an internal combustion engine and the rate of air bleed tuned to the engine characteristics, there results a significant improvement in fuel economy and a significant reduction in the emission of harmful exhaust materials.

I claim:

1. A fuel induction unit for an internal combustion engine, comprising an induction pipe, a carburettor mounted on said induction pipe, a venturi in said carburettor, a fuel inlet into said venturi, a heater for vapourizing the fuel positioned downstream of said venturi, and a cooler for converting the vapourized fuel into a homogeneous fog positioned downstream of said heater, said cooler comprising a second venturi and a cold air bleed opening into said second venturi, said unit incluidng a valve positioned downstream of said cooler for controlling the depression across both venturis.

2. A fuel induction unit according to claim 1 wherein said carburettor is devoid of a venturi-control valve.

3. A fuel induction unit according to claim 1 wherein said heater is a heat exchange element comprising a hollow casing, a water jacket in said casing and an annular passage in said water jacket.

4. A fuel induction unit according to claim 3 wherein said hollow casing is torroidal and wherein said water jacket is annular and has a generally U-shaped radial cross-secton, radially inwardly directed limb portions of said U-section flanking said passage.

* * * * *